(12) United States Patent
Christoffersson et al.

(10) Patent No.: US 8,553,724 B2
(45) Date of Patent: Oct. 8, 2013

(54) ENHANCED DYNAMIC COMPRESSION

(75) Inventors: Jan Christoffersson, Luleå (SE); Hans Hannu, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 529 days.

(21) Appl. No.: 12/091,621

(22) PCT Filed: Dec. 13, 2005

(86) PCT No.: PCT/SE2005/001906
§ 371 (c)(1),
(2), (4) Date: Apr. 25, 2008

(87) PCT Pub. No.: WO2007/069944
PCT Pub. Date: Jun. 21, 2007

(65) Prior Publication Data
US 2008/0267219 A1    Oct. 30, 2008

(51) Int. Cl.
*H04J 3/18* (2006.01)
*G06F 15/16* (2006.01)

(52) U.S. Cl.
USPC .......................................... 370/477; 709/247

(58) Field of Classification Search
USPC ................... 370/328, 477; 455/436; 709/247
See application file for complete search history.

(56) References Cited

U.S. PATENT DOCUMENTS

| | | | |
|---|---|---|---|
| 5,701,302 A | 12/1997 | Geiger | |
| 2007/0207805 A1* | 9/2007 | Pallares Lopez et al. | 455/436 |
| 2009/0274090 A1* | 11/2009 | Akhtar et al. | 370/328 |

FOREIGN PATENT DOCUMENTS

EP    1 376 878    1/2004

OTHER PUBLICATIONS

Hannu et al., "Signaling Compression (SigComp)—Extended Operations", *Network Working Group, Request for Comments*: 3321, Jan. 2003, [online] http://www.ietf.org/rfc/rfc3321.txt.
Price, R. et al, "Signaling Compression (SigComp)", IETF RFC 3320, Jan. 2003—http://www.ietf.org/rfc/rfc3320.txt.
Garcia-Martin, M. et al, "The Session Initiation Protocol (SIP) and Session Description Protocol (SDP) static dictionary for Signaling Compression—(SigComp)", IETF RFC 3485, Feb. 2003—http://www.ietf.org/rfc/rfc3485.txt.
3GPP Technical Spec. 24.229, "IP Multimedia Call Control Protocol based on Session Initiation Protocol (SIP) and Session Description Protocol (SDP)", Release 6, V6.6.0, (Mar. 2005).
Calhoun et. al, "Diameter Base Protocol", IETF RFC 3588, Sep. 2003—http://www.ietf.org/rfc/rfc3588.txt.
Rosenberg, J. et al, "SIP: Session Initiation Protocol", IETF RFC 3261, Jun. 2002—http://www.ietf.org/rfc/rfc3261.txt.

* cited by examiner

*Primary Examiner* — Mark Rinehart
*Assistant Examiner* — Gbemileke Onamuti
(74) *Attorney, Agent, or Firm* — Nixon & Vanderhye, P.C.

(57) ABSTRACT

The present invention is directed towards compressing and decompressing data transmitted between an end terminal (12) and a network server (20) controlling compression in communication sessions involving the end terminal. States related to the end terminal that are created and used for compressing and decompressing data transmitted between the end terminal and the network server when the end terminal is first registered to the first network server are saved as the end terminal deregisters from the first network server. When the end terminal again registers to the network server these saved states are directly used. In this way it is possible to start compressing data using the saved states immediately after a following registering for providing a more effective dynamic compression.

31 Claims, 4 Drawing Sheets

ENHANCED DYNAMIC COMPRESSION

This application is the U.S. national phase of International Application No. PCT/SE2005/001906 filed 13 Dec. 2005 which designated the U.S. the entire contents of each of which are hereby incorporated by reference.

TECHNICAL FIELD

The present invention relates to the reduction of data transmitted in data communication sessions. The invention more particularly relates to methods of reducing the amount of data transmitted between an end terminal and a first network server controlling compression in communication sessions involving the end terminal, communication devices for performing said reduction as well as computer program products for reducing the amount of data transmitted between an end terminal and a first network server.

BACKGROUND

There has in the recent years evolved a number of ways for users of different types of end terminals to be able to enjoy multimedia sessions that are normally IP-based. Such sessions include VoIP (Voice over IP) sessions, but also other types of sessions are feasible, like video sessions and Push-to-Talk. One standard that has evolved for such IP-based sessions is the standard SIP (Session Initiation Protocol). This standard is for instance described by Rosenberg, J. et al in SIP: Session Initiation Protocol, IETF RFC 3261, June 2002.

However when using such a protocol the amount of data transmitted is very high, which is problematic if wireless networks having limited bandwidth are used.

Because of this there have evolved different ways to compress data transmitted according to such a protocol.

One compression technique developed for SIP is SigComp. SigComp is described in more detail by Price, R. et. al. "Signaling Compression (SigComp)", IETF RFC 3320, January 2003. SigComp is an important technique to minimize the size of transmitted SIP messages over a radio interface of a cellular network. This is important primarily for two reasons; The size of the messages lead to long transmission times in the case of low bitrate links, which will negatively impact e.g. set-up times of IMS (IP Multimedia Subsystem) services. The large size of the uncompressed messages also lead to decreased capacity of the network, which is also negative and must be avoided as far as possible.

To make the compression efficient, the variable content of the SIP messages must be used in some way. There are a number of ways to do this and the most important techniques are static dictionaries, user-specific dictionaries (USD) and dynamic compression.

SIP static dictionaries are described by Garcia-Martin, M. et. al. in "The Session Initiation Protocol (SIP) and Session Description Protocol (SDP) static dictionary for Signaling Compression (SigComp)", IETF RFC 3485, February 2003. A static library is primarily useful for compression of the initial SIP message after an end terminal registers itself to a network function, often called a P-CSCF (Proxy-Call Session Control Function). However, the SIP static dictionary will not by itself result in satisfactory compression efficiency, other means are also necessary.

In "SigComp—Extended Operations" by Hannu, H. et. al., "Signaling Compression (SigComp) Extended Operations", IETF RFC 3321, January 2003, the concept of USD (User Specific Dictionary) and cross-session states are introduced. The user specific dictionary is a static dictionary, which is specific to an individual user. The content of the USD is not standardized which means that it needs to be sent from a compressing side to a decompressing side prior to its use. In case the USD is large, it may require several messages for the upload. This limits the usefulness of the dictionary for an initial message.

The cross-session state is described as prolonging the lifetime of a SigComp compartment, which is a memory area assigned to a user. However, this state is not further specified and this makes it impossible to use since two SigComp endpoints need to know exactly how long a compartment lifetime is. Failure to do this will result in loss of synchronization and decompression failure.

In 3GPP TS 24.229, IP Multimedia Call Control Protocol based on Session Initiation Protocol (SIP) and Session Description Protocol (SDP), Release 6, V6.6.0, (2005-03), a compartment lifetime is by definition the time the user is registered, i.e. the compartment is opened when the user registers and closed when the user de-registers. Any deviation from this will cause loss of synchronization and decompression failure.

The most efficient technique to obtain a high level of compression efficiency is to use dynamic compression. Dynamic compression is obtained by saving states, e.g. the contents of a message, and use these as a dictionary when compressing subsequent messages. A compartment is then opened for an end terminal for storing states. By repeating this process to add messages or parts of them to the state an efficient dictionary is built. Furthermore, it will adapt to long-term changes in the SIP messages following from new services or message flows.

However, dynamic compression suffers from one drawback; it is not efficient until a sufficient number of messages have been saved in a state. The number of messages is not important, but the messages must be diverse enough to capture the differences that are typical for SIP messages. The main problem is that the dictionary needs to be rebuilt every time a compartment is opened, since the states in the compartment are always deleted when the compartment is closed. For a typical user this means that every time the terminal is turned on and registers to a network server, the compression efficiency is low until the compartment has been filled with useful data. As a consequence, the first call setup will be slow due to inefficient compression.

Using a USD suffers from the same deficiency, i.e. that there is no USD available for the first message(s). After an upload of the USD the compression performance can be expected to be satisfactory.

There is thus a need for speeding up dynamic compression so that it functions well even in the initial phases of its use when performing a new registering of an end terminal to a network server.

SUMMARY

The technology disclosed herein is therefore directed towards solving the problem of speeding up dynamic compression so that it functions well even in the initial phases of its use when again registering an end terminal to a network server controlling compression in communication sessions involving the end terminal.

This is generally solved by saving terminal dedicated states each time an end terminal deregisters from a network server controlling communication sessions involving the end terminal.

One object of the technology disclosed herein is thus directed towards providing a method of reducing the amount of data transmitted between an end terminal and a first network server controlling communication sessions involving the end terminal.

This object is according to a first aspect of the technology disclosed herein achieved through a method of reducing the amount of data transmitted between an end terminal and a first network server controlling compression in communication sessions involving the end terminal, comprising the steps of:

creating at least one state related to the end terminal, which is registered to the first network server, during a first communication session between the end terminal and the first network server, said state being dedicated to the end terminal, compressing data for transmission between the end terminal and the server based on said state at least in the first communication session, storing said state for later use when the end terminal is being deregistered from the first network server, and upon a following registering of the end terminal to the network server for a second communication session involving the end terminal, compressing data for transmission between the end terminal and the network server in the second communication session based on said saved state.

This object is according to a second aspect of the technology disclosed herein also achieved through a method of reducing the amount of data transmitted between an end terminal and a first network server controlling compression in communication sessions involving the end terminal, comprising the steps of:

obtaining at least one state related to the end terminal, which is registered to the first network server, during a first communication session between the end terminal and the first network server, said state being dedicated to the end terminal, decompressing data transmitted between the end terminal and the server using said state at least in the first communication session, storing said state for later use when the end terminal is being deregistered from the network server, and upon a following registering of the end terminal to the network server for a second communication session, decompressing data transmitted between the end terminal and the network server using said state.

Another object of the technology disclosed herein is directed towards providing a communication device, which reduces the amount of data transmitted between an end terminal and a first network server controlling compression in communication sessions involving the end terminal.

This object is according to a third aspect of the technology disclosed herein achieved through a communication device comprising:

This object is according to a third aspect of the present invention achieved through a communication device comprising:

an interface unit for transmitting data between an end terminal and a first network server, a compressing unit for compressing data to be transmitted via the interface unit between the end terminal and the first network server, and a control unit arranged to create at least one state related to the end terminal, which is registered to the first network server, during a first communication session between the end terminal and the first network server, said state being dedicated to the end terminal, order the compressing unit to compress data to be transmitted between the end terminal and the first network server based on said state at least in the first communication session, store said state for later use when the end terminal is being deregistered from the first network server, and upon a following registering of the end terminal to the network server for a second communication session involving the end terminal, order the compressing unit to compress data to be transmitted between the end terminal and the first network server in the second communication session based on said state.

This object is according to a fourth aspect of the technology disclosed herein also achieved through a communication device comprising:

an interface unit for transmitting data between an end terminal and a first network server, a decompressing unit for decompressing data transmitted via the interface unit between the end terminal and the network server, and a control unit arranged to obtain at least one state related to the end terminal, which is registered to the first network server, during a first communication session between the end terminal and the first network server, said state being dedicated to the end terminal, order the decompressing unit to decompress data transmitted between the end terminal and the server based on said state at least in the first communication session, store said state for later use when the end terminal is being deregistered from the first network server, and upon a following registering of the end terminal to the first network server for a second communication session between the end terminal and the network server, order the decompressing unit to decompress data transmitted between the end terminal and the network server in the second communication session based on said state.

Still another object of the technology disclosed herein is directed towards providing a computer program product, which allows reduction of the amount of data transmitted between an end terminal and a first network server controlling compression in communication sessions involving the end terminal.

This object is according to a fifth aspect of the technology disclosed herein also achieved through a computer program product for reducing the amount of data transmitted between an end terminal and a first network server controlling compression in communication sessions involving the end terminal, comprising computer program code to make a communication device perform, when said code is loaded into the communication device:

create at least one state related to the end terminal, which is registered to the first network server, during a first communication session between the end terminal and the first network server, said state being dedicated to the end terminal and used for compression of data to be transmitted between the end terminal and the server at least in the first communication session, store said state for later use when the end terminal is being deregistered from the network server, and upon a following registering of the end terminal to the network server for a second communication session, set said state for use in compressing data to be transmitted between the end terminal and the network server in the second communication session.

This object is according to a sixth aspect of the technology disclosed herein also achieved through a computer program product for reducing the amount of data transmitted between an end terminal and a first network server controlling communication sessions involving the end terminal, comprising computer program code to make a communication device perform, when said code is loaded into the communication device:

obtain at least one state related to the end terminal, which is registered to the first network server, during a first communication session between the end terminal and the first network server, said state being dedicated to the end terminal and used in decompression of data transmitted between the end terminal and the first network server at least in the first communication session, store said state for later use when the end terminal is being deregistered from the network server, and upon a following registering of the end terminal to the network server for a second communication session between the end terminal and another terminal, set said state for use in decompressing data transmitted between the end terminal and the first network server in the second communication session.

The technology disclosed herein has many advantages. It allows the start of compressing messages using saved states immediately when the second communication session is started. This means that the compression is more effective than earlier, which required the analysis of messages also after a following registering of the end terminal and storing of states anew. Another advantage is that there is no transfer of the information provided in a state. This reduces the amount of data transmitted, which normally positively influences the associated costs for an end user and also limits the burden of the network. The risk for congestion in the network is therefore also lowered.

According to an advantageous variation of the technology disclosed herein a state is announced from a decompressing side to a compressing side. This variation has the advantage of allowing states to be stored elsewhere than in state memories, which cannot be done if compliance with SigComp is required, but still use the SigComp structure for saving states also when an end terminal is not registered to the first network server, which simplifies implementation of the invention in a SigComp environment.

According to another advantageous variation of the state information is stored for later use at a second network server. Saving may here be performed through, upon deregistering, sending a deregistering message comprising state information to a network server handling communication sessions for the first end terminal, said state information being intended to be stored in said second network server, sending a registering message to a network server handling communications sessions for the first end terminal when again registering, and receiving a response to said registering message including the state information. This has the advantage in that a home network has control of states saved for an end terminal.

The expression state as used herein is intended to comprise at least one string of data, which is then used through replacing this string in a message to be transmitted with a reference to the state.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which:

FIG. 3 shows a block schematic of different parts provided in a communication device according to the present invention providing compressing functionality, FIG. 4A schematically shows the content of a compartment for an end terminal and a persistent state store for the terminal before the terminal is being deregistered from the first network server, FIG. 4B schematically shows the content of a compartment for an end terminal and a persistent state store for the terminal after the terminal has again been registered to the first network server

DETAILED DESCRIPTION

The technology disclosed herein will now be described in relation to SIP (Session Initiating Protocol) and SigComp compression provided in relation to a wireless cellular network. It should however be realised that the invention is not limited to SIP, SigComp or wireless cellular networks, but is applicable to any network where compression is made of data to be transmitted using previously transmitted data.

Figure 1:
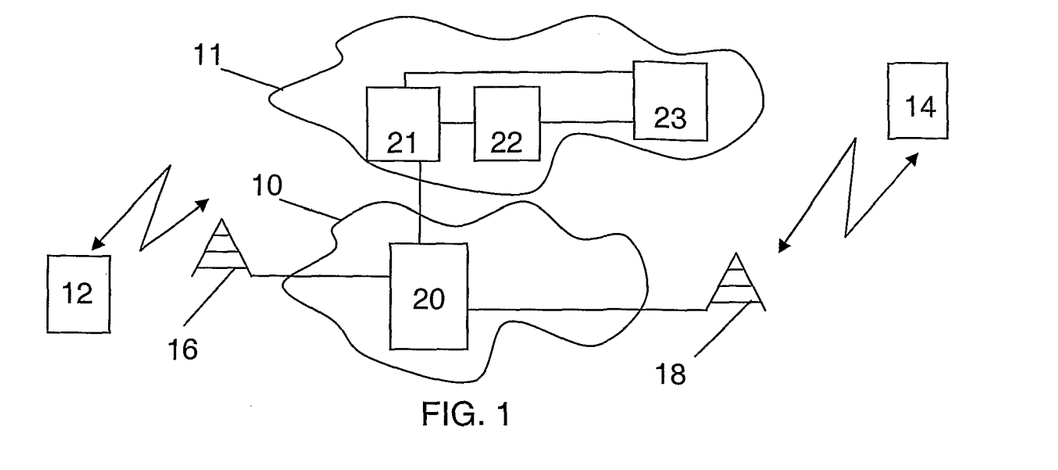
FIG. 1 schematically shows a number of end terminals connected to a first network server of a cellular network as well as a second network including a number of network servers.

FIG. 1 shows a first wireless cellular network 10 where a first end terminal 12 communicates with a first network server 20 via a first base station 16. There is also a second terminal 14 also communicating with the first network server 20 via a second base station 18. The first network server 20 is a P-CSCF (Proxy Call-Session Control Function) server. There is furthermore a second network 11, which is the home network of the first end terminal 12. In this second network 11 there is a second network server 23, which is a so-called HSS server (Home Subscriber Server) that keeps track of subscribers (terminals) and data relating to them like their subscriptions, like services available to an end terminal. This second network server 23 communicates with a third network server 21 and a fourth network server 22, where the two latter servers 21 and 22 also communicate with each other. The third network server 21 is an I-CSCF (Interrogating Call-Session Control Function) server, while the fourth network server 22 is an S-CSCF (Service Call-Session Control Function) server. The first network server 20 furthermore communicates with the third network server 21. The first server 20 thus allows terminals to engage in IP based communication sessions, like VoIP (Voice over IP) sessions. In this regard it is possible that the first end terminal 12 engages in a communication session with the second end terminal 14. However it is possible that the first end terminal 12 can engage in communication sessions with other end terminals in other networks, which other network would then normally require a corresponding first network server 20. It should furthermore be realised that the networks presented in FIG. 1 are simplified networks and that there might be provided several more servers and base stations. They can also comprise a number of exchanges. The first end terminal 12 is in the present example a portable communication device in the form of a cellular phone. Likewise it should be realised that an end terminal may be any type of end terminal with computer communication ability.

According to SIP, messages are exchanged between end terminals via a SIP server. Data messages or datagrams are then exchanged between the first end terminal and the first network server, where the first network server then forwards and receives messages intended for another end terminal of a communication session, like for instance the second end terminal 14. However, because of the limited bandwidth of the wireless link between the first end terminal and the first base station, there is a need to reduce the amount of data in the messages transmitted. Thus there is a need for compressing the data.

For this reason the SigComp compressing/decompressing algorithm is used. SigComp is described in more detail by Price, R. et, al. "Signaling Compression (SigComp)", IETF RFC 3320, January 2003, which is herein incorporated by reference. Normally a compressing function and a decompressing function is provided on both sides of a communication link, i.e. in both an end terminal and a server in order to provide two-way communication. However, these principles can also be applied on one-way communication. For this reason the following description of the technology disclosed herein will be based on there being only one compressor, which is furthermore provided in the first end terminal and only one decompressor, which is provided in the first network server. It should however be realised that a compressor might be provided in the first network server instead and a decompressor in the first end terminal instead. In normal cases there is furthermore one compressor/decompressor pair provided in both the server and the end terminal. A server also serves more than one end terminal. In order to simplify the description of the technology disclosed herein, the case of only serving one end terminal will be described.

Figure 2:
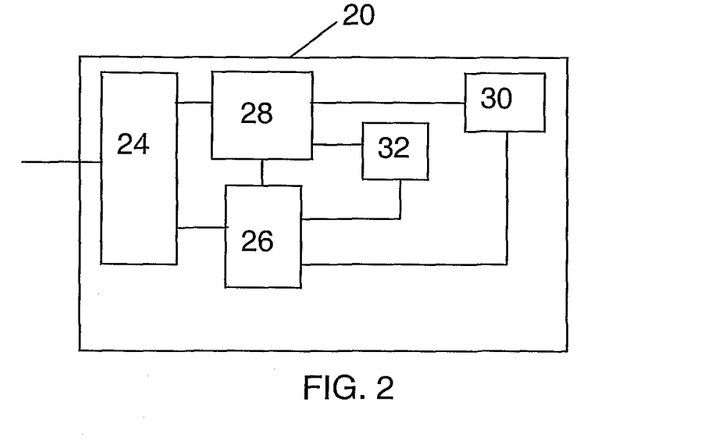
FIG. 2 shows a block schematic of different parts provided in a communication device according to the present invention providing decompressing functionality.

FIG. 2 shows a block schematic of the relevant parts of one communication unit according to the an example embodiment of the technology disclosed herein, which is here the first network server 20 for handling communication with the first end terminal. The network server 20 is therefore provided with a first interface unit 24 for communication with other entities like the first end terminal 12 via the first base station 16. The interface unit 24 is connected to a decompressor 26 and to a server control unit 28 providing SIP handling as well as a state handler and decompressor dispatcher according to SigComp. The server control unit 28 is connected to the decompressor 26, to a local store 30 providing a state memory (SM) according to SigComp, where a compartment for the first terminal is set up as well as to a persistent state store 32. The persistent state store may here be provided as the local available state store provided by SigComp. The decompressor 26 is also connected to the local store 30 as well as to the persistent state store 32. It should here be realised that the local store 30 might include more compartments for other end terminals that the first network server 20 communicates with. The persistent state store 32 might furthermore include sections for other end terminals than the first end terminal. What a state is and how a state is used will be described shortly. The functionality provided by these entities will in the following also be termed decompressing side.

Figure 3:
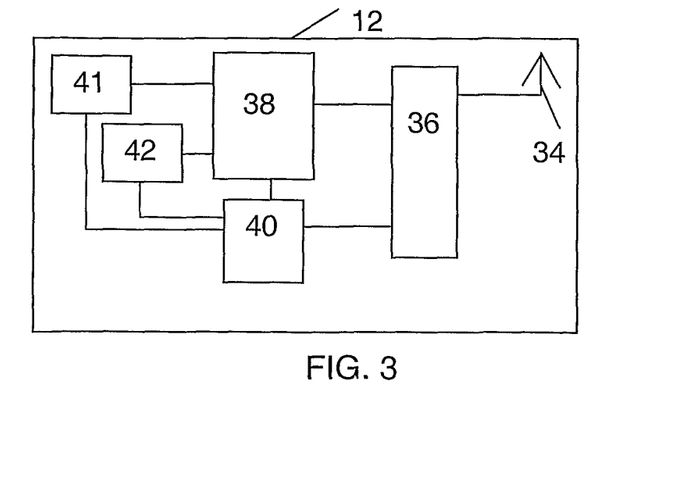

FIG. 3 shows a block schematic of the relevant parts of another communication unit according to an example embodiment of the technology disclosed herein, which is here the first end terminal 12 for handling communication with the first network server 20. For this reason the first end terminal 12 is equipped with an antenna 34 connected to a second interface unit 36 for providing radio communication, for instance according to the GPRS standard. The interface unit 34 is connected to a terminal control unit 38 and to a compressor 40. The terminal control unit 38 provides SIP handling as well as a state handler and a compressor dispatcher according to SigComp. The terminal control unit 38 is also connected to the compressor 40 as well as to a local store 41 and a persistent state store 42. Also the compressor 40 is connected to the local store 41 and the persistent state store 42. The device and the functionality of FIG. 3 will in the following also be termed compressing side. The local store 41 and the persistent state store 42 essentially have the same function as the local store 30 and persistent state store 32 on the decompressing side. There is one difference though, which is related to a difference between an end terminal and a server and not to a compressor and decompressor, and that is that the local store 41 and persistent state store 42 on the terminal side only store states related to the first end terminal and not related to other terminals, while this is possible on the server side. An end terminal side decompressor can be obtained through replacing the compressor 40 with a decompressor 26 or through adding a decompressor 26 and connecting it to the local store 30, the persistent state store 32, the terminal control unit 38 and the interface unit 36. In a similar fashion the server 20 can be modified for providing compressor functionality in addition to or instead of the decompressor function.

Figure 4A:
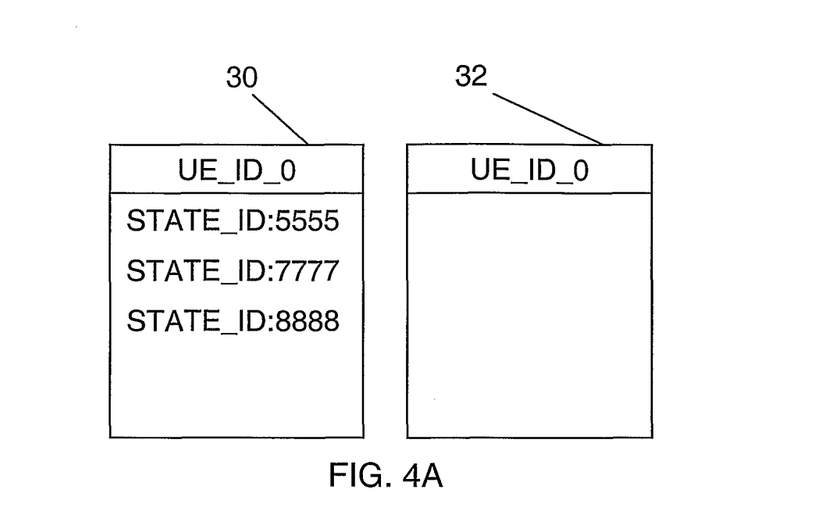
Figure 4B:
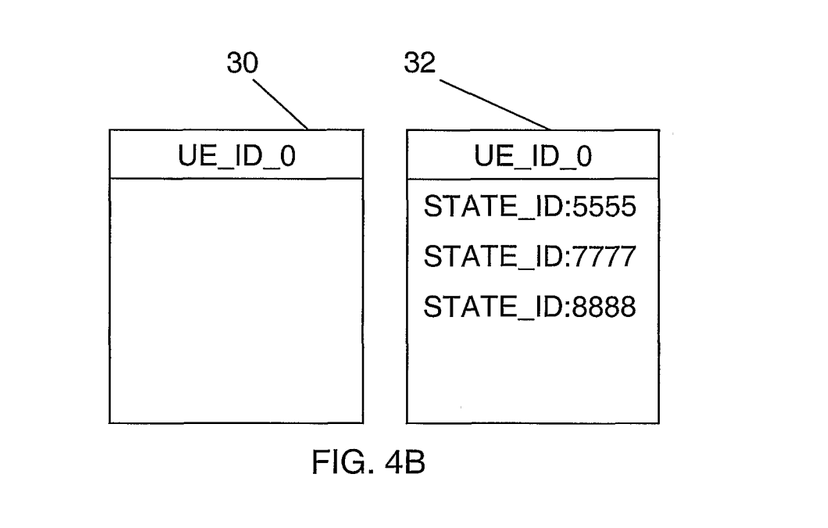

FIG. 4A shows the local store 30 for the first terminal in the first network server, where a compartment for the first terminal, which has a terminal identity UE_ID_0 has been created by reserving some memory space. The content here is provided as the first terminal is connected to the first network server during a first set of communication sessions and includes a number of states STATE_ID:5555, STATE_ID:7777 and STATE_ID:8888. The persistent state store 32 is also shown. However it is empty for the first terminal with the identity UE_ID_0. FIG. 4B shows the local store 30 and the persistent state store 32 of FIG. 4A when the end terminal is being deregistered from the first network server. It can here be seen that the content that was previously in the compartment has been moved to the persistent state store.

Figure 5:
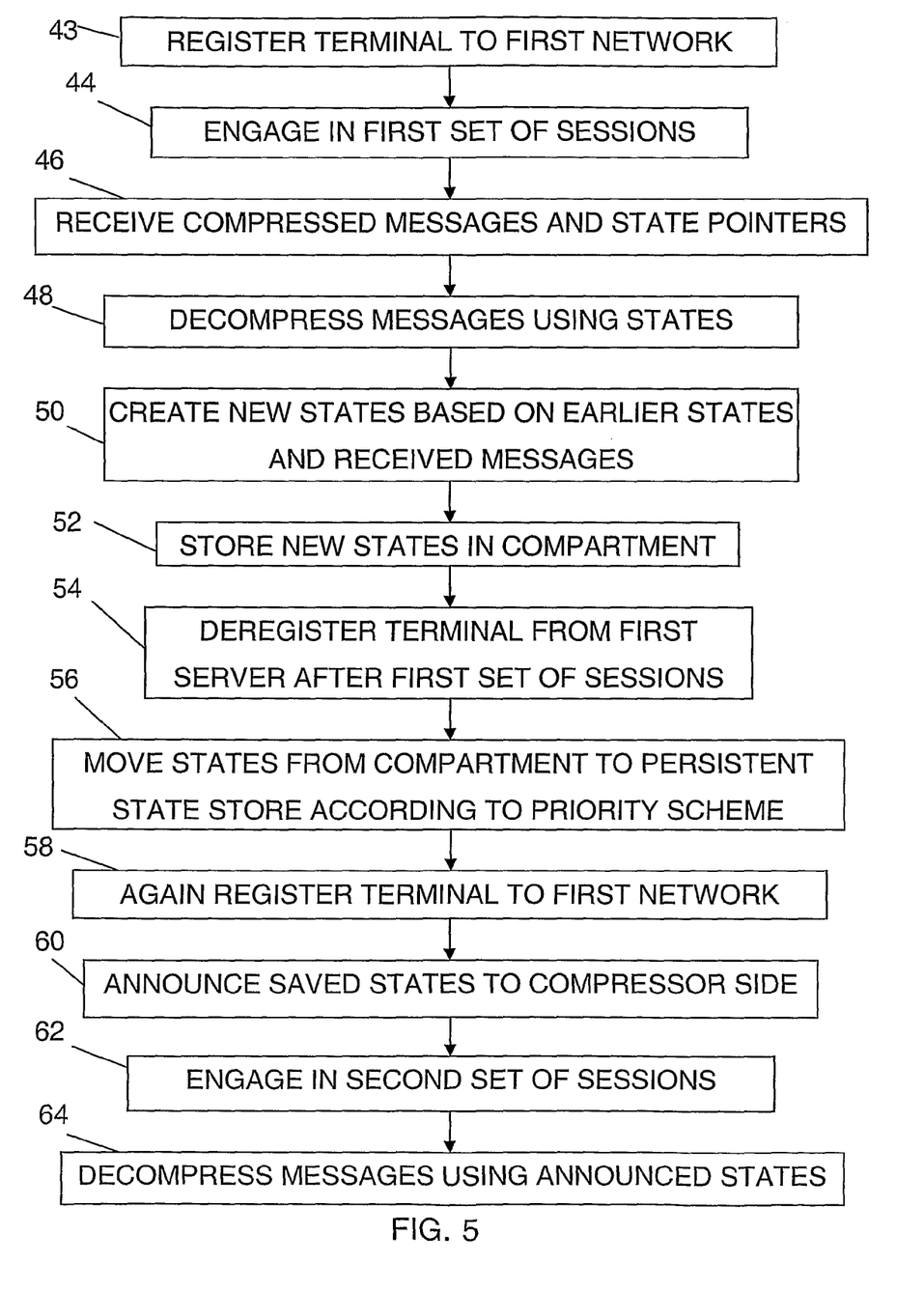
FIG. 5 shows a flow chart of a method provided in a communication device having decompressing functionality.
Figure 6:
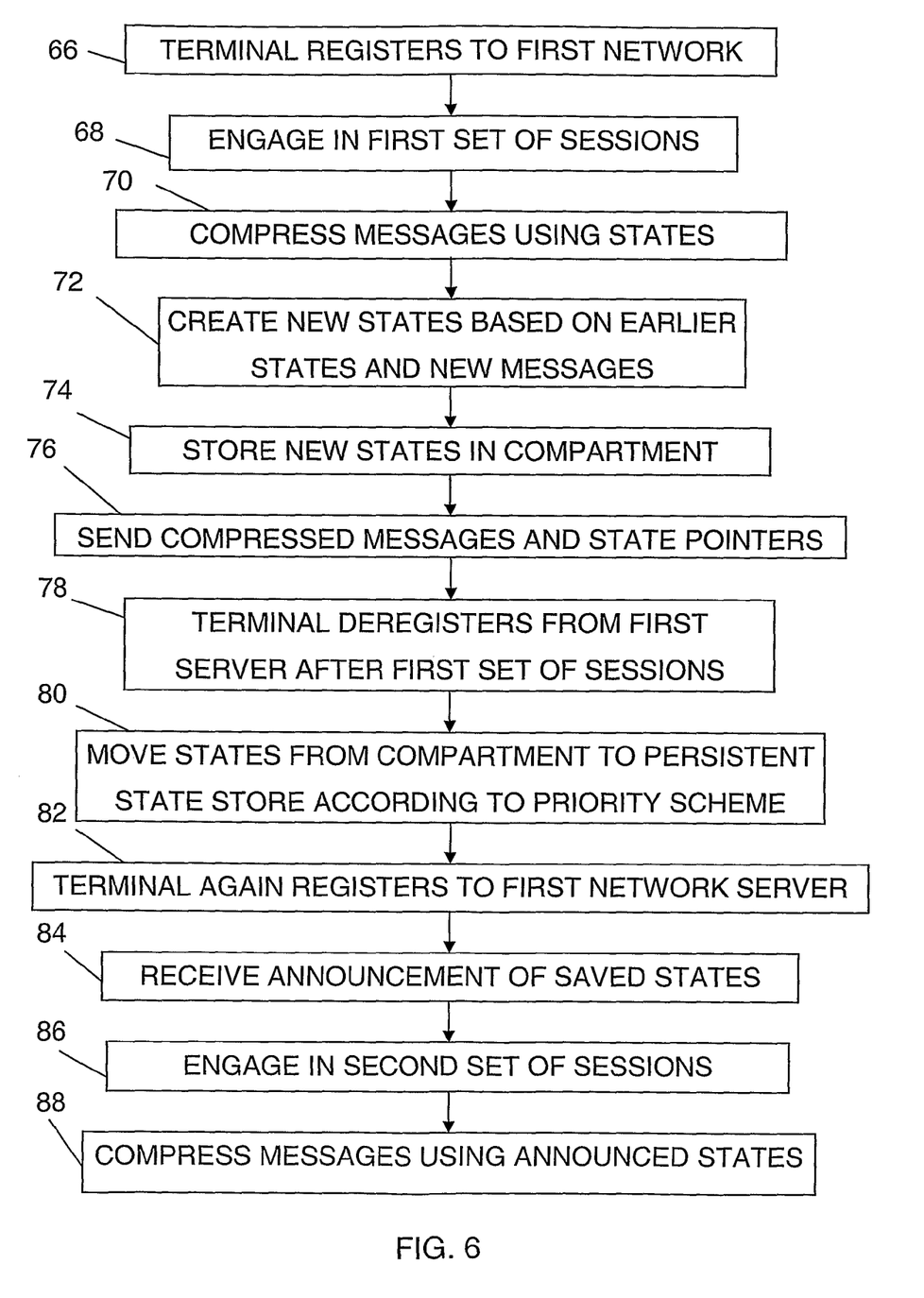
FIG. 6 shows a flow chart of a method provided in a communication device having compressing functionality, and FIG. 7 schematically shows a computer program product in the form of a CD Rom disc comprising computer program code for carrying out the invention.

Now the functioning of the invention according to an embodiment of the technology disclosed herein will be described with reference being made to the previously described FIG. 1-4 as well as to FIG. 5, which shows a flow chart of method steps provided on the decompressing side and in this example in the first network server, and FIG. 6, which shows a flow chart of method steps being provided in the compressing side and in this example in the first end terminal.

All starts with the first end terminal 12 performing an initial registering of itself to the first network server 20 in order to start a communication session, for instance a communication session with the second end terminal 14, step 43 and 66.

The Call Session Control Function" (CSCF) provides the IP multimedia basic SIP session handling. It has three functional roles—a "service CSCF" (S-CSCF), a "interrogating CSCF" (I-CSCF) and a "proxy CSCF" (P-CSCF).

The first network server 20 is the first point of contact for the first end terminal 12 and is here provided in a visiting network 10, i.e. a network that the first end terminal 12 wishing to engage in a SIP session is visiting. The first end terminal 12 thus sends a register message to the first network server 20. The first network server 20 looks at the URI (Uniform Resource Identifier) of this register message. It may then perform a DNS (Domain Name Service) query to discover an IP address to forward the register message to and would then get the address of the third network server 21 in the second network 11. The first network server 20 proxies SIP messages towards the home network 11 for the subscriber of the end terminal 12. The first network server 20 may perform number internationalization, and it may enforce policies in the GGSN (gateway GPRS support node) relating to the handling of the bearer traffic for IP multimedia.

The third network server 21 is the entry point to the home network 11. The first network 10 will use DNS (Domain Name System) to route messages to the home network 11, which will lead the SIP signaling to the third network server 21. The third network server 21 then queries the second network server 23 to obtain information of the location of an S-CSCF server using a diameter protocol. The second network server 23 then informs the third server 21 that one has not been allocated. The third network server 21 then selects an S-CSCF, and here the fourth network server 22 and forwards the registration message to the fourth network server 22.

The fourth network server 22 is the SIP proxy which provides the access to the operator provided services to the end-user. The fourth network server 22 downloads any subscriber profile relating to the user of the first end terminal 12 or of the end terminal itself and updates location information in the second network server 23 in order to inform it that it is the S-CSCF for that end terminal. Then after any interaction with the services, the fourth network server 22 can, by using the DNS infrastructure, continue the routing of the communication session. Once all this has been done a 200 OK message is sent from the fourth network server 22 to the first end terminal 12 via the third network server 21 and the first network server 20.

As the first end terminal 12 registers, the decompressing side furthermore receives a byte code, which byte code comprises decompressing instructions and instructions about how to save states. This byte code is saved in the compartment 30 of the terminal. These instructions on how to save states is equivalent to providing the decompressing side with knowledge of how the compressing side operates when saving states, so that the decompressing side can use that knowledge in saving states that are identical to the states saved on the compressing side. As it registers it is possible to engage in SIP sessions under the control of the server control unit 28, which here functions according to SIP, as described by Rosenberg, J. et al in SIP: Session Initiation Protocol, IETF RFC 3261, June 2002, which is herein incorporated by reference. As it registers, the server control unit 28 reserves a memory area UE_ID_0 in the local store 30 as a compartment for the first end terminal 12. In the same way the terminal control unit 28 reserves a memory area in local store 41. The same is furthermore done in the persistent state stores 32 and 42. Thereafter the first end terminal 12 can get engaged in communication sessions. Thus, at this point in time, when the first end terminal 12 is registered to the first network server 20, the server 20 and the first end terminal 12 are both engaged in a first set of communication sessions including at least one first communication session, step 44 and 68.

As the first end terminal wants to engage in a communication session with another terminal, for instance the second end terminal 14, the terminal control unit 28 generates data messages according to the SIP protocol. The terminal control unit 28 then forwards these data messages to the compressor 40. When the compressor 40 receives a first data message it performs compressing using a first state, which state may be a possible USD (User-Specific Dictionary) or a SIP static dictionary or a combination of both, where this state may for instance be state STATE_ID:5555. The compressor 40 then compresses the data messages using the states and in compressing replaces a string in a message with a reference to a state. The reference is here normally provided in the form of an offset and length, i.e. the location of the string in a state and the length of the string. In this way the message size is lowered or the amount of data transmitted reduced. It then creates a new state, which is done by updating the earlier used state. The created state may here be state STATE_ID:7777. A new state STATE_ID:7777 is typically created by adding the whole or parts of the new message to the original state STATE_ID:5555. A state thus typically includes strings of previously sent messages that may be used in compressing later messages. The created state has a certain identity or identifier, which is normally provided as a hash of the content of the state. Typical information that can be provided in a state is address information, like an e-mail address of the end terminal, other terminals or persons contacted by the end terminal, type of speech coder like AMR, and used port numbers. The new state is then stored in the compartment 41. The compressed message is thereafter sent from the compressor 40 to the server 20 via the terminal interface unit 36 and antenna 34, where the sent data message includes, apart from the compressed message, also a pointer to the state used, i.e. STATE_ID:5555. The message is further accompanied by a request for acknowledgement. In this first communication session the end terminal 12 thus compresses data messages using states, step 70, creates new states based on earlier states and new messages that are to be sent, step 72, stores the new states in the compartment 41, step 74, and sends compressed messages and states pointers to the decompressing side, step 76.

The compressed message and state pointer are received by the decompressing side interface unit 24 and forwarded to the decompressor 26 by the server control unit 28. The server control unit 28 keeps the state pointer and retrieves the first state from the compartment of the first end terminal in the local store 30 based on this state pointer. Thereafter the server control unit 28 forwards the retrieved state to the decompressor 26. The decompressor 26 decompresses the message using the byte code and state by replacing a reference to a state with the appropriate string. The decompressor 26 then forwards the decompressed message to the server control unit 28. The control unit 28 then creates a new state based on instructions provided in said byte code. This state will then be identical with the state created on the compressing side, i.e. STATE_ID:7777. The state is saved in the compartment for the end terminal in local store 30. It is thus dedicated to the first end terminal 12, since this terminal 12 is the only terminal that can save states in this compartment. Thereafter the server control unit 28 acknowledges the reception of the message, which may typically be done together with a sending of a compressed message from the server 20 to the end terminal 12. The compressing side receives this acknowledgement. In this first communication session the first network server 20 thus receives compressed messages and state pointers, step 46, decompresses messages using states indicated by state pointers, step 48, creates new states based on earlier states and received messages using the byte code, step 50, and stores the new states in the compartment 30, step 52.

By the acknowledgement the compressing side furthermore knows that the message has been received and also that the new state has been saved. This means that the compressing side may now use the saved state in compressing a next message. If no acknowledgement is received the state can not be used. Then the compressing side creates new states based on the previous state in the same way as was described above.

In this way compression and decompression of messages continue for the whole first communication session. In this way a number of states can be created and saved for the end terminal 12, where three STATE_ID:5555, STATE_ID:7777 and STATE_ID:8888 are shown in FIG. 4A. States are furthermore retained as long as the end terminal 12 is registered to the first network server 20. This means that the states in the compartments 30 and 41 may be used also in other communication sessions within this first set, and may be used as long as the end terminal 12 is registered to the first network server 20. What has been described above is normal dynamic compression according to the SigComp standard. However after a while the end terminal 12 decides to deregister from the network server 20, step 54 and 78. When this happens the states stored in the compartments 30 and 41, STATE_ID: 5555, STATE_ID:7777 and STATE_ID:8888, are moved into the persistent state store 32 of the server 20 that belongs to the end terminal and persistent state store 42 of the end terminal 12, step 56 and 80. This thus happens both on the compressing side as well as on the decompressing side. Since the amount of storage is limited it is here possible to use a priority scheme for deciding what states are to be saved. It is for instance possible to save all states if there is room, only the latest states, only the latest state together with one or more states having a highest priority or a number of states having the highest priorities. The compartments are then emptied or closed, as is required by the SigComp specification.

After a while, which may be a very long time, the first end terminal 12 once again registers to the first network server 20, steps 58, and 82. When this is done the decompressing side announces the saved states to the compressing side, steps 60 and 84, which may be done through sending an announcement. The announcement can be made using returned parameters sent in compressed messages, where a returned parameter is set as a state identifier. Announcements are described in more detail in "Signaling Compression (SigComp)", IETF RFC 3320, January 2003 by Price, R. et. al., which is herein incorporated by reference. The control unit 38 of the compressing side then investigates the states stored in persistent state store 42 and allows the use of those which have been announced by the decompressing side. As the end terminal 12 then engages in a second set of communication sessions including at least a second communication session, step 62 and 86, the compressor starts compressing messages destined for the decompressing side using these announced states, step 88, and the decompressing side starts decompressing the messages using the states indicated by the compressing side, which states are normally the same as it has announced, step 64. Thereafter states are created, saved and used in the same way as described above. This continues for as long as the first end terminal 12 is registered to the first network server 20. When it deregisters states are yet again saved to the persistent state stores. The above described method steps are then repeated each time the first end terminal registers to and deregisters from the first network server.

In this way it is possible to start compressing messages using the announced and saved states immediately when a communication session is started in the second set of communication sessions. This means that the dynamic compression is more effective than earlier, which required the analysis of messages also after a following registration of the end terminal and storing of states anew. Another advantage is that there is no transfer of these strings provided in the states. This reduces the amount of data transmitted, which normally positively influences the associated costs for an end user and also limits the burden of the network. The risk for congestion in the network is therefore also lowered. Since the states are not stored in the local stores that are here used for the state memories required by SigComp, they do not interfere with the state memory content and cause loss of synchronization between the compressor view of what is in the state memory of the decompressing side, and what is really there. Since the local store is untouched, there is no impact on or from SigComp nodes that do not support saving of states upon deregistering an end terminal. There is furthermore no need for standard changes, neither in 3GPP or IETF.

In the embodiment described above, the first network server 20 stored the states locally. It is however possible that it stores them in the second network server HSS 23. When this is done a register message (comprising deregistering information) is sent from the first end terminal 12 to the first network server 20, which forwards it to the fourth network server 22 via the third network server 21. This register message would then also include state information, either in the form of whole states (identifier and state value) or only state identifier, to be stored in the second network server 23 for the first end terminal or user of the first end terminal. When the fourth network server 22 receives the SIP register message from the first network server 20, it retrieves the state information from the register message and forwards it to the second network server 23 using a diameter message. The second network server 23 then saves the state information for later communication sessions.

When the first end terminal then again registers to the first network server 20, this register message goes via the first network server 20 to the third network server 21 and then to the assigned fourth network server 22. The fourth network server 22 then retrieves subscriber information from the second network 23 server using the diameter protocol. The response from the second network server 23 may then include state information related to the first end terminal 12 that is communicating with the first network server 20. The state information can then be carried in the body of a SIP 200 OK message. When the first network server receives this 200 OK message it retrieves the state information and stores it in the storage 30 so that it is possible for the first network server 20 to use these states in communication sessions. The state information may, as has been mentioned above, be full states or only state identifiers. When only state identifiers are received this is used to tell the compressing side (and decompressing side) of the first network server 12 what states saved according to the principles described above that are to be made available to the end terminal. Diameter messages are described in more detail in IETF RFC 3588—"Diameter Base Protocol, P. Calhoun et. al, September 2003, which is herein incorporated by reference. The main advantage of this variation of the technology disclosed herein is that the home network has control of states saved for an end terminal.

The SIP 200 Ok message may here have a new content type specified in the header, for instance "Content-Type: text/sigcomp state info" indicating that the information in the message body is SigComp state information. In the Diameter message the state information may be carried in an AVP (Attribute Value Pair) and if an existing such AVP cannot be used a new one may be created.

Figure 7:
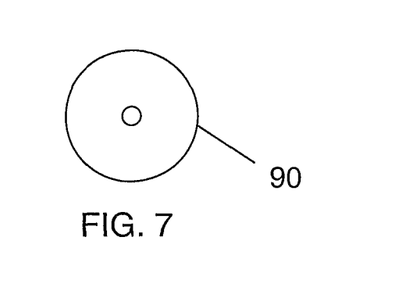

The technology disclosed herein can be implemented through one or more processors together with computer program code for performing the functions of the invention. This is especially the case for the control units and the compressor and decompressor. The interface units are normally provided as separate circuits for instance as ASIC circuits, whereas the stores can be provided as suitable memory units for instance in the form of hard disc, ROM, RAM etc. The program code mentioned above may also be provided as a computer program product, for instance in the form of a data carrier carrying computer program code for performing the method according to the technology disclosed herein when being loaded into the first end terminal and/or the first network server. One such carrier 90, in the form of a CD ROM disc is generally outlined in FIG. 7. It is however feasible with other data carriers such as a memory stick. The computer program code can furthermore be provided as pure program code on a server and downloaded to a communication unit remotely.

There are several variations that are possible to make of the technology disclosed herein. It is possible that the decompressing side generates a state. In this case it would store it and announce it to the compressing side. Upon the announcement the compressing side would then also store it. Also these states may then be stored and saved for use when the first end terminal makes a new registering to the first network server. The decompressing side may also receive states from the compressing side instead of creating them based on a byte code. The first network server may furthermore be provided in the home network of the first end terminal. The first, second, third and fourth network servers may be provided in one single physical unit, but with different node functionality. They may also be provided in two different physical units, three different physical units or four different physical units. Therefore the present invention is only to be limited by the following claims.

The invention claimed is:

1. A method of reducing the amount of data transmitted between an end terminal and a first network server controlling compression in communication sessions involving the end terminal, the method comprising:
   using a processor comprising the end terminal to create at least one state, related to the end terminal, which is registered to the first network server, during a first communication session between the end terminal and the first network server, said state being dedicated to the end terminal,
   using the processor, compressing data for transmission between the end terminal and the server based on said state at least in the first communication session,
   using the processor, deregistering the end terminal from the first network server;
   storing said state for later use when the end terminal is being deregistered from the first network server, and
   using the processor, registering the end terminal to the first network server again;
   after registering the end terminal to the first network server again, using the processor to compress data for transmission between the end terminal and the first network server in a second communication session based on said stored state.

2. A method according to claim 1, further comprising receiving at least one state announcement announcing states when said end terminal is again registered to the server and using a stored state corresponding to the announced state when compressing data in said second communication session.

3. A method according to claim 2, further comprising comparing an identifier of the announced state with identifiers of stored states and allowing the use of said state in compressing if a match is made.

4. A method according to claim 1, wherein there is more than one state and storing said state for later use comprises saving states according to a priority setting.

5. A method according to claim 1, further comprising:
   sending a deregistering message comprising state information to a second network server which handles communication sessions for said first end terminal upon deregistering, said state information being intended to be stored in said second network server,
   sending a registering message to a network server handling communication sessions for said first end terminal when again registering, and
   receiving a response to said registering message including said state information.

6. The method according to claim 1, wherein the second communication session is an immediate successor communication session to the first communication session.

7. A method according to claim 1, further comprising, when the end terminal is being deregistered from the first network server, storing said state as said state exists upon deregistration.

8. A method of reducing the amount of data transmitted between an end terminal and a first network server controlling compression in communication sessions involving the end terminal, the method comprising:
   using a processor, comprising the first network server to obtain at least one state which is related to the end terminal, registered to the first network server, and created during a first communication session between the end terminal and the first network server, said state being dedicated to the end terminal,
   using the processor, decompressing data transmitted between the end terminal and the server using said state at least in the first communication session,
   using the processor, determining that the end terminal is deregistering from the first network server,
   in response to determining the end terminal deregistering from the first network server, storing said state for later use when the end terminal is being deregistered from the network server,
   using the processor, determining that the end terminal is registering to the first network server again, and
   in response to determining that the end terminal is registering to the first network server again, using the processor to decompress data transmitted between the end terminal and the network server using said state.

9. A method according to claim 8, further comprising sending a state announcement upon a new registering of the end terminal for allowing the use of the announced state when compressing data in said second communication session.

10. A method according to claim 8, wherein there is more than one state and wherein storing said state for later use comprises saving states according to a priority setting.

11. A method according to claim 8, wherein the obtaining the at least one state comprises receiving said state or information allowing creation of said state.

12. A method according to claim 8, wherein obtaining the at least one state comprises creating said at least one state.

13. A method according to claim 8, wherein obtaining at least one state, decompressing the data for transmission in the first communication session, and decompressing the data for transmission upon the following registering in the second communication session are performed in the first network server and state information is stored for later use at a second network server handling data concerning the end terminal and further comprising retrieving said state from the second server.

14. A method according to claim 8, further comprising, when the end terminal is being deregistered from the network server, storing said state as said state exists upon deregistration.

15. An end terminal communication device comprising:
    an interface unit for transmitting data between the end terminal communication device and a first network server, a compressing unit arranged to compress data to be transmitted via the interface unit between the end terminal communication device and the first network server, and a control unit arranged to create at least one state, related to the end terminal communication device, which is registered to the first network server, during a first communication session between the end terminal communication device and the first network server, said state being dedicated to the end terminal communication device, order the compressing unit to compress data to be transmitted between the end terminal communication device and the first network server based on said state at least in the first communication session, deregister the end terminal from the first network server, store said state for later use when the end terminal communication device is being deregistered from the first network server, register the end terminal to the first network server again, and order the compressing unit to compress data to be transmitted between the end terminal communication device and the first network server in a second communication session based on said state.

16. The end terminal communication device according to claim 15, wherein the control unit is further arranged to receive at least one state announcement announcing states when said end terminal communication device is again registered to the server and order the use of a stored state corresponding to the announced state when compressing data in said second communication session.

17. The end terminal communication device according to claim 16, wherein the control unit is further arranged to compare an identifier of the announced state with identifiers of stored states and allow the use of said announced state in compressing if a match is made.

18. The end terminal communication device according to claim 15, wherein there is more than one state and the control unit is arranged to save states according to a priority setting.

19. The end terminal communication device according to claim 15, further comprising a persistent state store where said states are stored for later use.

20. The end terminal communication device according to claim 15, wherein the control unit is further arranged to order storing of state information for later use at a second network server handling data concerning the end terminal communication device and to order the interface unit to retrieve said state information from the second network server.

21. The end terminal communication device according to claim 20, wherein the control unit is further arranged to order the interface unit to send a deregistering message comprising state information to a second network server which handles communication sessions for said first end terminal communication device upon deregistering, said state information being intended to be stored in said second network server, order the interface unit to send a registering message to a network server handling communications sessions for said first end terminal communication device when again registering, and receive a response to said registering message including said state information.

22. The end terminal communication device according to claim 15, wherein the control unit is arranged to store said state as said state exists upon deregistration for the later use when the end terminal is being deregistered from the first network server.

23. A network server communication device comprising:

an interface unit arranged to transmit data between the network server communication device and an end terminal, a decompressing unit arranged to decompress data transmitted via the interface unit between the end terminal and the network server communication device, and a control unit arranged to obtain at least one state which is related to the end terminal, registered to the network server communication device, and created during a first communication session between the end terminal and the network server communication device, said state being dedicated to the end terminal, order the decompressing unit to decompress data transmitted between the end terminal and the server based on said state at least in the first communication session, determine that the end terminal is deregistering from the network server communication device, store said state for later use when the end terminal is being deregistered from the network server communication device, determine that the end terminal is registering to the network server communication device again, and order the decompressing unit to decompress data transmitted between the end terminal and the network server in a second communication session based on said state.

24. A communication device according to claim 23, wherein the control unit is further arranged to order the sending of a state announcement when the end terminal is again registered to the first network server communication device for allowing the use of the announced state when compressing data in said second communication session.

25. A communication device according to claim 23, wherein there is more than one state and the control unit is arranged to save states according to a priority setting.

26. A communication device according to claim 23, wherein the control unit when obtaining said state receives said state or receives information allowing the creation of said state.

27. A communication device according to claim 23, wherein the control unit when obtaining said state creates said state.

28. A communication device according to claim 23, wherein the control unit is further arranged to order storing of state information for later use at a second network server communication device handling data concerning the end terminal and to order the-interface unit to retrieve said state information from the second network server communications device.

29. A communication device according to claim 23, wherein the control unit is arranged to store said state as said state exists upon deregistration for the later use when the end terminal is being deregistered from the network server communication device.

30. A computer program product for reducing the amount of data transmitted between an end terminal and a first network server controlling compression in communication sessions involving the end terminal, the computer program product comprising computer program code stored in a non-transitory computer-readable storage medium which, when executed, causes a communication device to:

create at least one state related to the end terminal, which is registered to the first network server, during a first communication session between the end terminal and the first network server, said state being dedicated to the end terminal and used for compression of data to be transmitted between the end terminal and the server at least in the first communication session, the register the end terminal from the first network server, store said state for later use when the end terminal is being deregistered from the network server, register the end terminal to the first network server again, and after registering the end terminal to the first network server again, set said state for use in compressing data to be transmitted between the end terminal and the first network server in a second communication session.

31. A computer program product for reducing the amount of data transmitted between an end terminal and a first network server controlling compression in communication sessions involving the end terminal, the computer program product comprising computer program code stored in a non-transitory computer-readable storage medium which, when executed, causes a communication device to:

obtain at least one state related to the end terminal, which is registered to the first network server, during a first communication session between the end terminal and the first network server, said state being dedicated to the end terminal and used in decompression of data transmitted between the end terminal and the first network server at least in the first communication session, determine that the end processor is deregistering from the first network server, store said state for later use when the end terminal is being deregistered from the first network server, determine that the end terminal is registering to the first network server again, and in response to determining that the end terminal is registering to the first network server again, set said state for use in decompressing data transmitted between the end terminal and the first network server in a second communication session.

* * * * *

UNITED STATES PATENT AND TRADEMARK OFFICE
CERTIFICATE OF CORRECTION

PATENT NO.        : 8,553,724 B2                                    Page 1 of 2
APPLICATION NO.   : 12/091621
DATED             : October 8, 2013
INVENTOR(S)       : Christoffersson et al.

It is certified that error appears in the above-identified patent and that said Letters Patent is hereby corrected as shown below:

On the Title Page, in Item (56), under "OTHER PUBLICATIONS", in Column 2, Line 4, delete "et al," and insert -- et al., --, therefor.

On the Title Page, in Item (56), under "OTHER PUBLICATIONS", in Column 2, Line 6, delete "et al," and insert -- et al., --, therefor.

On the Title Page, in Item (56), under "OTHER PUBLICATIONS", in Column 2, Line 13, delete "et. al," and insert -- et al., --, therefor.

On the Title Page, in Item (56), under "OTHER PUBLICATIONS", in Column 2, Line 15, delete "et al," and insert -- et al., --, therefor.

In the Specification:

In Column 1, Line 37, delete "et. al." and insert -- et al., --, therefor.

In Column 1, Line 54, delete "et. al. in" and insert -- et al., --, therefor.

In Column 1, Line 63, delete "et. al.," and insert -- et al., --, therefor.

In Column 3, Lines 54-56, delete "This object ...... comprising:".

In Column 6, Line 6, delete "present invention" and insert -- technology disclosed herein --, therefor.

In Column 6, Line 9, delete "present invention" and insert -- technology disclosed herein --, therefor.

In Column 6, Line 18, delete "server" and insert -- server, --, therefor.

In Column 6, Line 42, delete "(Proxy Call-Session" and insert -- (Proxy-Call Session --, therefor.

Signed and Sealed this
Eleventh Day of February, 2014

Michelle K. Lee
*Deputy Director of the United States Patent and Trademark Office*

CERTIFICATE OF CORRECTION (continued)
U.S. Pat. No. 8,553,724 B2

In Column 6, Line 52, delete "(Interrogating Call-Session" and insert -- (Interrogating-Call Session --, therefor.

In Column 6, Line 54, delete "(Service Call-Session" and insert -- (Service-Call Session --, therefor.

In Column 7, Line 18, delete "et, al." and insert -- et al., --, therefor.

In Column 7, Line 38, delete "the an example" and insert -- an example --, therefor.

In Column 8, Line 54, delete "Function"" and insert -- Function --, therefor.

In Column 11, Line 34, delete "et. al.," and insert -- et al., --, therefor.

In Column 12, Line 45, delete "Protocol, P. Calhoun et. al," and insert -- Protocol", P. Calhoun et al., --, therefor.